United States Patent [19]
Runaldue et al.

[11] Patent Number: 6,067,408
[45] Date of Patent: May 23, 2000

[54] FULL DUPLEX BUFFER MANAGEMENT AND APPARATUS

[75] Inventors: Thomas J. Runaldue; Jeffrey Roy Dwork, both of San Jose, Calif.

[73] Assignee: Advanced Micro Devices, Inc., Sunnyvale, Calif.

[21] Appl. No.: 08/605,532

[22] Filed: Feb. 22, 1996

Related U.S. Application Data

[63] Continuation of application No. 08/068,696, May 27, 1993, abandoned.

[51] Int. Cl.$^7$ ............................................. H01J 1/00
[52] U.S. Cl. ................................... 395/250; 395/250
[58] Field of Search ........................................... 395/250

[56] References Cited

U.S. PATENT DOCUMENTS

| | | | |
|---|---|---|---|
| 4,151,598 | 4/1979 | Webster | 395/444 |
| 4,298,954 | 11/1981 | Bigelow et al. | 395/250 |
| 4,472,803 | 9/1984 | Iijima | 370/522 |
| 4,506,324 | 3/1985 | Healy | 395/290 |
| 4,590,467 | 5/1986 | Lare | 340/825.5 |
| 4,799,215 | 1/1989 | Suzuki | 370/227 |
| 4,823,312 | 4/1989 | Michael et al. | 395/250 |
| 4,841,550 | 6/1989 | George et al. | 375/371 |
| 4,893,304 | 1/1990 | Giacopelli et al. | 370/411 |
| 4,918,597 | 4/1990 | Krishnan et al. | 395/309 |
| 4,942,553 | 7/1990 | Dalrymple et al. | 395/250 |
| 4,945,548 | 7/1990 | Iannarone et al. | 375/214 |
| 5,043,981 | 8/1991 | Firoozmand et al. | 370/235 |
| 5,072,420 | 12/1991 | Conley et al. | 395/877 |
| 5,111,294 | 5/1992 | Asai et al. | 348/415 |
| 5,126,999 | 6/1992 | Munter et al. | 370/415 |
| 5,136,584 | 8/1992 | Hedlund | 370/399 |
| 5,146,564 | 9/1992 | Evans et al. | 395/250 |
| 5,155,810 | 10/1992 | McNamara, Jr. et al. | 395/250 |
| 5,159,591 | 10/1992 | Gohara et al. | 370/396 |
| 5,165,021 | 11/1992 | Wu et al. | 395/250 |
| 5,175,818 | 12/1992 | Kunimoto et al. | 395/200.2 |
| 5,179,661 | 1/1993 | Copeland, III et al. | 395/250 |
| 5,210,749 | 5/1993 | Firoozmand | 370/463 |
| 5,335,325 | 8/1994 | Frank et al. | 395/490 |
| 5,440,691 | 8/1995 | Carrafiello et al. | 395/250 |
| 5,448,701 | 9/1995 | Metz et al. | 395/293 |
| 5,546,543 | 8/1996 | Yang et al. | 395/250 |

FOREIGN PATENT DOCUMENTS

| | | |
|---|---|---|
| 0029331 | 5/1981 | European Pat. Off. . |
| 0116863 | 8/1984 | European Pat. Off. . |
| 0141742 | 5/1985 | European Pat. Off. . |
| 0225024 | 6/1987 | European Pat. Off. . |
| 0245765 | 11/1987 | European Pat. Off. . |
| 0307931 | 3/1989 | European Pat. Off. . |
| 0359137 | 3/1990 | European Pat. Off. . |
| 0360721 | 3/1990 | European Pat. Off. . |
| 0425964 | 5/1991 | European Pat. Off. . |
| 2009983 | 6/1979 | United Kingdom . |
| 1564989 | 4/1980 | United Kingdom . |
| 2133188 | 7/1984 | United Kingdom . |
| 2176917 | 1/1987 | United Kingdom . |
| 2184270 | 6/1987 | United Kingdom . |
| 2203616 | 10/1988 | United Kingdom . |
| 2222504 | 3/1990 | United Kingdom . |
| 2226739 | 7/1990 | United Kingdom . |
| 2248007 | 3/1992 | United Kingdom . |
| 2256563 | 12/1992 | United Kingdom . |
| 92/15055 | 9/1992 | WIPO . |

*Primary Examiner*—Robert B. Harrell
*Assistant Examiner*—Kenneth R. Coulter
*Attorney, Agent, or Firm*—Sawyer & Associates

[57] ABSTRACT

A node having a system interface adapter for intercoupling a fixed speed bus to a variable latency bus. The system interface adapter includes a receive FIFO buffer memory, a transmit FIFO buffer memory, and a memory buffer management unit. The memory buffer management unit dynamically awards priority between the two FIFOs for access to the variable latency bus in a fashion to minimize overflowing or underflowing the FIFOs while reducing the FIFO sizes. Priority between pending receive data transfers and pending transmit data transfers is resolved, in part, upon a whether a receive operation vis-à-vis the fixed-speed bus is underway.

3 Claims, 2 Drawing Sheets

FULL DUPLEX BUFFER MANAGEMENT AND APPARATUS

This application is a continuation of application Ser. No. 08/068,696 filed on May 27, 1993, now abandoned.

BACKGROUND OF THE INVENTION

This invention relates to buffer management techniques for transferring data between two asynchronous systems and, more particularly, to a technique for dynamically allocating priority in servicing buffer memories installed between a local area network and a system memory.

In some types of networks, e.g. ETHERNET®, once a node begins to transmit or receive a data packet, the data must continue uninterrupted, and at a speed determined by the network, until the entire packet has been processed. A node can be, for example, a computer attached to the network. The computer typically has a network interface coupled to the network and to an internal system bus. The various components, subsystems, and peripherals of the computer are typically coupled to the system bus as well. The components typically include a storage device and a processor of some type. Most computer systems move all data between the various components by use of the system bus. The access to the system bus is strictly controlled, often through use of an interrupt system in which various services have an associated priority, and devices are awarded use of the system bus based partially on their priority level.

For data packets received from the network, the computer transfers the data to the storage device through the system bus to await further processing. Immediate access to the storage device is not guaranteed because the other computer components also use the system bus. The storage device access, through the system bus, is said to have variable latency or delay because the access time cannot be predicted in advance.

A well known solution to this problem of variable latency is to provide the computer with a buffer memory between the network and the system bus. When the computer denies the network interface access to the system bus, the network interface stores the data in the buffer memory. When the computer grants access to the storage device through the system bus, the computer empties the buffer memory, and "catches up" with the network. It is possible for the computer to catch up because the data speed of the system bus is typically much faster than the effective data transmission rate of the network. An overflow condition develops when the computer denies the buffer memory access to the system bus for too long and the buffer memory fills to capacity. Additional data from the network is lost because there is no way to suspend the receipt of data. The network protocol handles this situation by detecting an overflow condition and causes a node to retransmit the entire data packet. It is desirable, therefore, to minimize the number of overflow conditions of the computer system to improve the network efficiency.

A similar difficulty is presented during transmission of data from the storage device, to the network. Once network access is granted, the computer must send data at a predetermined fixed rate, but the storage device may not always be able to supply data at this rate, particularly because the storage device requires the cooperation of the system bus. The variable latency problem of the system bus interferes with reliable transmissions. Another buffer memory in the transmit path allows the network interface to supply a limited amount of data to the network even when the computer denies access to the storage device. For transmissions to the fixed-speed network, there is the possibility for buffer memory to underflow when the computer denies the buffer memory access to the storage for too long and the network interface completely empties the buffer memory. Upon detecting an underflow, the transmission stops and the network purges the incomplete data packet. The network requests that the computer retransmit the data packet.

Traditional designs for managing buffer memories in communication systems treat transmit and receive operations as completely independent of each other. If a receive operation is in progress, a buffer memory manager gives priority to completion of the receive operation, at least until the node receives and stores a complete data packet in the storage device. Only then is any attention given to possible transmit operations, but if another receive operation begins, the computer aborts the transmit operation. In a busy network, receive operations monopolize the buffer memory manager's time, and, consequently, it is possible to delay indefinitely transmissions from the computer. This problem is sometimes referred to as receive lockout of transmission.

Another solution interleaves receive and transmit operations relative to the storage device. This solution allows the computer to begin a transmission operation even though all data transfers to the storage device, due to the receive operations, have not been completed. This solution has the advantage that it makes more aggressive use of the network communication channel, but has the disadvantage that it is more prone to overflows and underflows, because it requires the system bus to carry more data in the same period of time.

What is still needed in this field is a more efficient buffer memory management system that minimizes or avoids buffer memory overflow and underflow conditions, but provides aggressive sharing of transmit and receive operations with minimal loss of data. While the prior art recognizes that small buffers are desirable for many reasons, an obvious solution would be to simply increase the size of the buffer memories until the size reduces overflow and underflow conditions to a desired level. However, increasing buffer memory size increases hardware cost and imposes additional time delays in both the transmit and receive paths.

Still another solution simply improves the data speed of the system bus, by increasing the bus speed or the data path width, so that the conflicting requirements for system bus access can be met without significantly improving the buffer management technique employed. This solution also increases hardware costs and is not completely satisfactory.

It will be appreciated from the foregoing that there is a need for a more efficient buffer memory management system for use in interfacing between asynchronous components, such as a local area network and a storage device with variable latency. The present invention is directed to this end.

SUMMARY OF THE INVENTION

The present invention provides for a buffer management system to dynamically allocate priority between two buffer memories, a receive memory and a transmit memory, when accessing a storage device having a variable latency. The invention reduces buffer size and minimizes the number of overflows and underflows. Further, the invention simply and efficiently reduces the problem of receive lockout of transmission.

The preferred embodiment of the present invention includes a node having a network system interface adapter with a memory buffer management unit, a transmit FIFO buffer memory and receive FIFO buffer memory, and a network interface. This system interface adapter attaches to a system bus, from which there are also attached a CPU, a storage device and other peripheral devices. The transmit and receive FIFO buffer memories are sized, in the preferred embodiment, to store about two minimal size data packets. Network packets can vary in size between 64 and 1518 bytes. The network interface provides information to the buffer memory management unit regarding whether a receive activity is taking place, while the FIFOs provide information regarding the number of bytes stored and if at least one complete transmit frame is present.

The buffer memory management unit, based upon the information from the FIFOs and the network interface, awards priority to a particular one of the FIFOs, providing it access to the storage device. In the preferred embodiment, the FIFOs access the storage device through a direct memory access (DMA) burst transfer initiated and controlled by the memory buffer management unit. The memory buffer management unit prioritizes a pending receive DMA burst transfer over a pending transmit DMA burst transfer dependent upon whether a receive operation is occurring and the status of the fill levels of the receive and transmit FIFO buffer memories.

In operation, the memory buffer management unit will award priority to a pending receive DMA burst transfer over a pending transmit DMA burst transfer as long as the transmit FIFO buffer memory stores one or more frames, and the receive FIFO buffer memory stores a number of bytes greater than a predetermined threshold (that is, it requests to be emptied), while a receive operation is in progress. If so, the pending receive DMA burst transfer occurs over the pending transmit DMA burst transfer. After the burst transfer, the system reevaluates the signals anew to determine which, if any, of the buffers need servicing.

The preferred embodiment allows for full duplex operation (when transmit and receive can occur simultaneously, similar to most modem data calls) though the present invention is implemented effectively for half-duplex network systems, e.g. ETHERNET®, at the present. The preferred embodiment also effectively interleaves transmit and receive activity. The threshold of one or more frames in the transmit FIFO buffer memory as a condition for awarding priority for a receive DMA burst transfer is arbitrary and may be programmable, although in the present implementation it is fixed. An advantage of recognizing a complete transmit frames in the FIFO is that it allows the algorithm to utilize the minimum time between transmissions, if any, imposed by the network protocol. An advantage of the invention is that it gives equal access to transmit and receive operations. That is, even when receiving data packets, the buffer memory management unit will spend some amount of time filling the transmit FIFO buffer memory to guarantee transmit access to the network. Another advantage of the present invention is that there are minimized underflows of the transmit FIFO buffer memory because the memory buffer management unit always allows some transmit DMA operations to take place when less than one packet is contained in the transmit FIFO.

Other features and advantages of the present invention will be apparent after reference to the remaining portions of the specification, including the drawings.

DESCRIPTION OF THE PREFERRED EMBODIMENT

Figure 1:
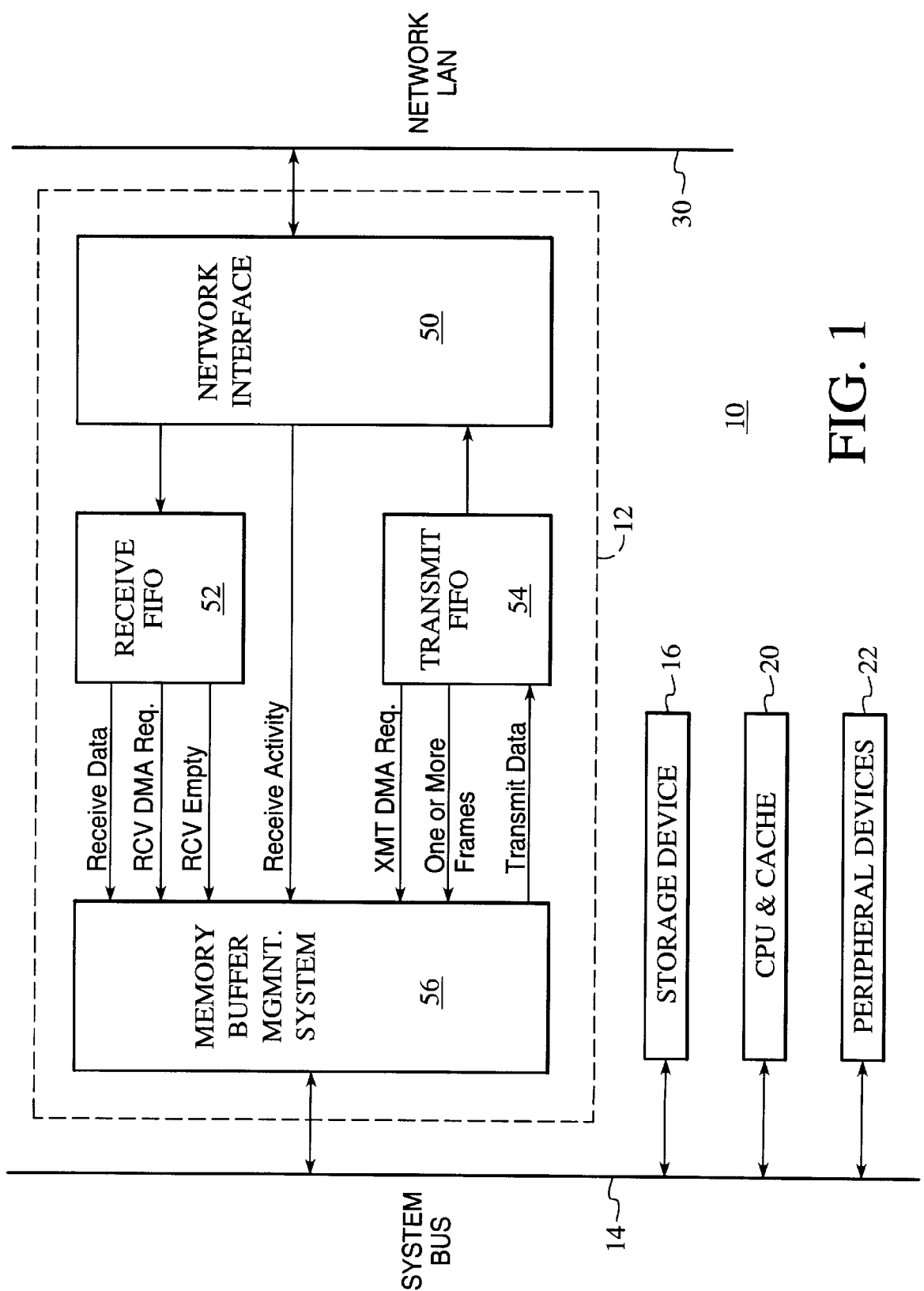
FIG. 1 is a block diagram of a node 10 including a preferred embodiment of the present invention.

FIG. 1 is a block diagram of a node 10 including a preferred embodiment of the present invention. Node 10 includes a system interface adapter 12 coupled to a system bus 14. The system bus 14 interconnects the system interface adapter 12 to a storage device 16, a central processing unit (CPU) 20, and other peripheral devices 22.

System interface adapter 12 couples the system bus 14 to a network 30. System interface adapter 12 includes a network interface 50 coupled to the network 30 for processing and translating data between the system bus 14 and network 30. The system interface adapter 12 also includes two buffer memories, a receive first-in first-out (FIFO) buffer memory 52, and a transmit FIFO buffer memory 54. Receive FIFO buffer memory 52 receives data bytes from network interface 50 and temporarily stores them until they can be sent to storage device 16, while transmit FIFO buffer memory 54 receives data bytes from storage device 16 and temporarily stores them until the bytes are sent to network interface 50 for transmission onto network 30. A memory buffer management unit 56, coupled to system bus 14 as well as to network interface 50, receive FIFO buffer memory 52, and transmit FIFO buffer memory 54, controls access of the FIFO buffer memories to storage device 16.

Memory buffer management unit 56 dynamically allocates priority between the FIFO buffer memories responsive to control signals from the FIFO buffer memories as well as from network interface 50. These control signals include a RECEIVE ACTIVITY signal from network interface 50 indicating whether system interface adapter 12 is participating in a receive operation with network 30. Assertion of the RECEIVE ACTIVITY signal indicates that network interface 50 is presently receiving one or more bytes of data.

In the preferred embodiment of the present invention, network interface 50 asserts the RECEIVE ACTIVITY signal after it decodes an address portion of an input packet and determines that the input packet is destined for node 10. In other applications, it may be desirable to have network interface 50 assert the RECEIVE ACTIVITY signal upon detecting any input activity at a receiver.

Each of the FIFO buffer memories generate control signals indicating a status of the amount of data presently stored. Receive FIFO buffer memory 52 not only provides memory buffer management unit 56 with the received data, but with a RECEIVE DIRECT MEMORY ACCESS (DMA) REQUEST signal and a RECEIVE FIFO EMPTY (RCV. EMPTY) signal. Receive FIFO buffer memory 52 asserts the RECEIVE DMA REQUEST signal when the number of bytes it stores exceeds a predefined threshold. This threshold is selectably adjustable in the preferred embodiment.

In the preferred embodiment, a user may select either 16 bytes, 32 bytes, or 64 bytes as the threshold for asserting the RECEIVE DMA REQUEST signal. The default is 64 bytes. When the number of bytes stored in receive FIFO buffer memory 52 exceeds the selected threshold, it asserts the RECEIVE DMA REQUEST signal. Once the number of stored bytes falls below the threshold, receive FIFO buffer memory 52 deasserts the RECEIVE DMA REQUEST signal unless an end-of-packet identifier is stored. Storage of the end-of-packet identifier causes receive FIFO buffer memory 52 to assert the RECEIVE DMA REQUEST signal without regard to the number of bytes stored. Receive FIFO buffer memory 52 asserts a RECEIVE (RCV) EMPTY signal when no more bytes are stored.

Transmit FIFO buffer memory 54 receives transmit data from memory buffer management unit 56, and provides memory buffer management unit 56 with two control signals; a transmit DMA request (XMT DMA REQ.) signal and a ONE OR MORE FRAMES signal. The transmit FIFO buffer memory 54 asserts the XMT DMA REQ. signal when the number of bytes it can store exceeds a predefined threshold. This threshold, similar to the one of the receive FIFO buffer memory 52, is adjustably selectable between 16, 32 or 64 bytes in the preferred embodiment. The transmit FIFO buffer memory 54 asserts the ONE OR MORE FRAMES signal when it stores the ending of a FRAME (the first part of the FRAME may have already been transmitted. A frame is the total serial bit information which is transmitted onto the media. In ETHERNET®, a frame includes a preamble, destination address, source address, type or length field, packet data and frame check sequence code. Not shown is a transmit FULL signal indicating when transmit FIFO buffer memory 54 is full.

Depending upon a state of these control signals, memory buffer management unit 56 determines a priority for the FIFO buffer memories and will initiate a DMA transfer burst for one of the FIFO buffer memories. When one of the FIFOs is in condition for a DMA burst transfer, but is waiting for the memory buffer management unit 56 to award priority, the particular DMA burst transfer is said to be pending. Operation of system interface adapter 12, and memory buffer management unit 56, will be explained by reference to FIG. 2.

Figure 2:
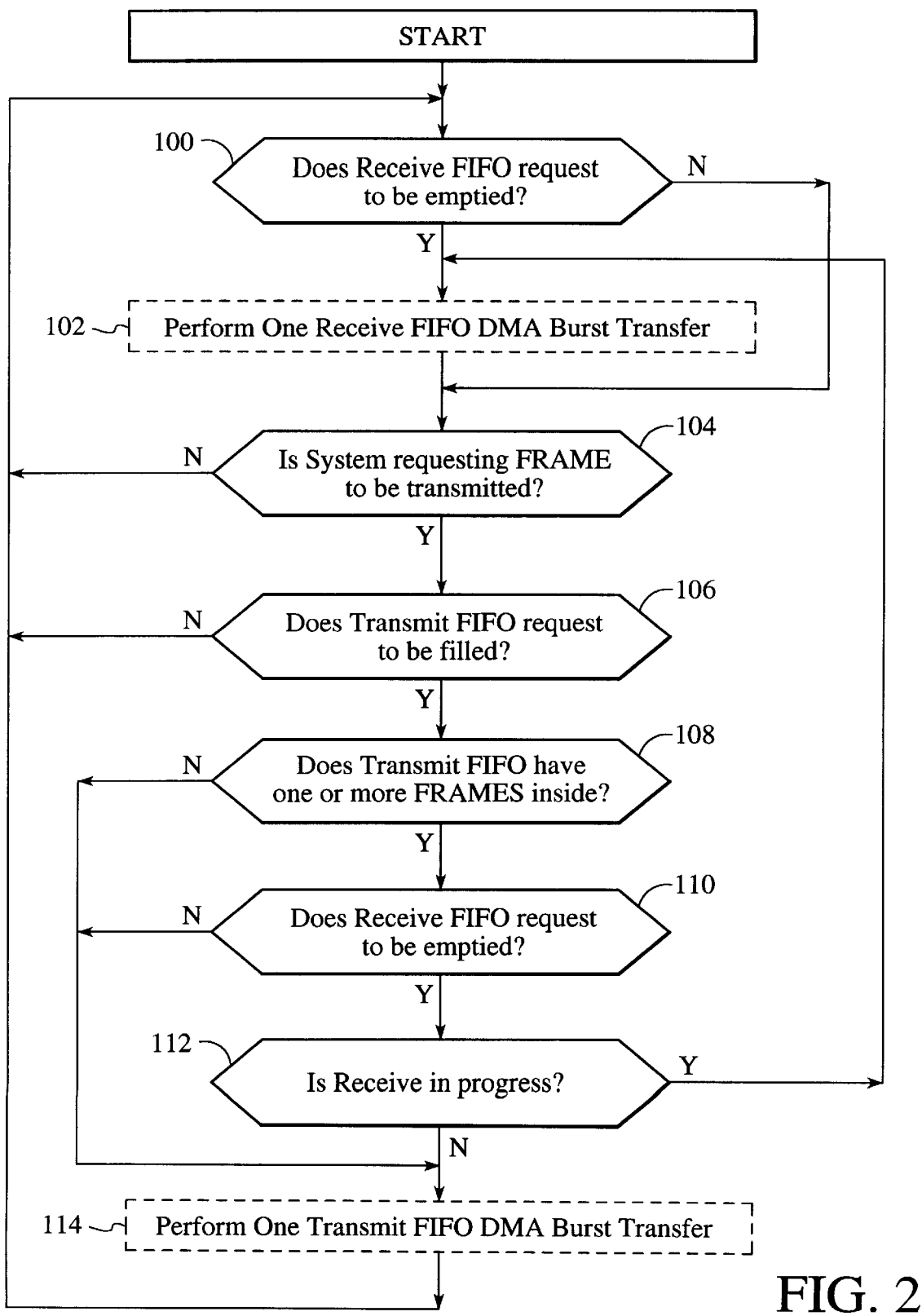
FIG. 2 is a process flow diagram illustrating operation of the memory buffer management unit 56.

FIG. 2 is a process flow diagram illustrating operation of the memory buffer management unit 56. Initially, or just after receiving a packet, receive FIFO buffer memory 52 will assert the RECEIVE DMA REQUEST signal. Memory buffer management unit 56 checks, at step 100, whether the receive FIFO buffer memory asserts the RECEIVE DMA REQUEST signal. Upon observing the RECEIVE DMA REQUEST signal, memory buffer management unit 56 advances to step 102 and initiates one receive DMA burst transfer, as well known in the art.

Once initiated, the DMA burst transfer continues until the RCV EMPTY signal is asserted. DMA is well known and there are many ways to implement it. It is possible to limit a DMA to a number of bytes or to a particular time interval to ensure fair access to all devices on the system bus. Particulars regarding DMA procedures are beyond the scope of the present invention but a particular DMA implementation effects threshold values for the FIFO signals.

After performing the receive DMA burst transfer, the process advances to the transmit request check at step 104. If receive FIFO buffer memory 52 does not assert the RECEIVE DMA REQUEST signal when checked at step 100, the process skips step 102 and jumps to step 104.

Step 104 tests whether node 10 desires to transmit a frame to network 30. If no transmission is desired, the process loops back to step 100 to process any received data. However, if at step 104, node 10 indicates that it desires to transmit a frame, the process advances to step 106 to test the status of transmit FIFO buffer memory 54. If transmit FIFO buffer memory 54 does not assert the XMT DMA REQ. signal, memory buffer management unit 56 does not attempt to transfer data into transmit FIFO buffer memory 54, and therefore returns to step 100.

If at step 106, transmit FIFO buffer memory 54 asserts the XMT DMA REQ. signal, the process advances to step 108 to check the status of the ONE OR MORE FRAMES signal. If transmit FIFO buffer memory 54 asserts the ONE OR MORE FRAMES signal, the process advances to step 110 to check the status of the RECEIVE DMA REQUEST signal. If receive FIFO buffer memory 52 asserts the RECEIVE DMA REQUEST signal at step 110, the process advances to step 112 to check the status of the RECEIVE ACTIVITY signal. If, at step 112, network interface 50 asserts the RECEIVE ACTIVITY signal, the process jumps to step 102 to perform one receive FIFO DMA burst transfer. However, if the RECEIVE ACTIVITY signal is not asserted at step 112, the process advances to step 114 to perform one transmit FIFO DMA burst transfer. Thereafter, the process returns to step 100. If either the test at step 108 for assertion of the ONE OR MORE FRAMES signal, or the test at step 110 for the status of the RECEIVE DMA REQUEST signal are not true, then the process jumps directly to step 114 to perform the transmit FIFO DMA burst transfer.

Note that the present invention controls and dynamically allocates priority between two FIFOs desiring access to a storage device having variable latency. By use of the preferred embodiment as disclosed and described herein, systems are able to employ smaller buffers while still minimizing a number of overflows and underflows. The preferred embodiment reduces the occurrence of the receive lockout of transmission problem, and evenly distributes accesses between receiving and transmitting operations. While the present invention is useful for application with half-duplex LANs, the invention is also applicable to full duplex systems.

In the preferred embodiment, the receive FIFO has a different capacity than the transmit FIFO. The FIFOs have a logical size smaller than the physical size to account for pipelining effects. The receive FIFO has a physical size of 132 bytes and a logical size of 128 bytes. The transmit FIFO has a physical size of 140 bytes and a logical size of 136 bytes.

While the above is a description of the preferred embodiment of the present invention, various modifications and enhancements are possible without departing from the invention. For example, the number of frames which may trigger a decision 108 may vary with the size of Transmit FIFO 54. Transfers between storage device 16 and transmit buffer memory 52 and/or receive buffer memory 54 need not be via direct memory access. Any data transfer mechanism suited to the system bus 14, storage device 16 and CPU 20 may be used by the memory buffer management unit 56. Therefore the preceding is not to be taken as limiting the scope of the present invention in any way. The appended claims define the scope of the invention.

What is claimed is:

1. An apparatus for managing bi-directional data flow between a first data bus having a fixed data flow rate and a storage device connected to a second data bus wherein the second data bus has a variable latency for data flow, the apparatus comprising:

a network interface, coupled to the first data bus, for receiving a first data packet from the first data bus and for transmitting a second data packet to the first data bus, said network interface asserting a receive activity signal while it receives said first data packet;

a receive buffer memory, having a first predetermined physical size and a first predetermined logical size, coupled to said network interface, for storing a portion of said first data packet, said receive buffer memory asserting a receive data transfer request signal when one or more bytes are stored therein;

a transmit buffer memory, having a second predetermined physical size, the second predetermined physical size differing from the first predetermined physical size and a second predetermined logical size, the second predetermined logical size differing from the first predetermined logical size, for storing a portion of said second data packet, and coupled to the network interface, said transmit buffer memory asserting a transmit data transfer request signal when a capacity for a number of bytes stored in said transmit buffer memory exceeds a predetermined number, and said transmit buffer memory asserting a frames signal when one or more frames are stored in said transmit buffer memory; and a memory buffer controller, coupled to said receive buffer memory, said transmit buffer memory, and the second data bus for controlling access to and from the second data bus by dynamically prioritizing data transfers to the storage device from said receive buffer memory and said transmit buffer memory responsive to said receive data transfer request signal, said receive activity signal, said transmit data transfer request signal and said frames signal, such that the memory buffer controller prioritizes a receive transfer over a transmit transfer according to a status of the transmit buffer memory and receive buffer memory and whether a receive operation is occurring.

2. An apparatus for managing bi-directional data flow between a first data bus having a fixed data flow rate and a storage device connected to a second data bus wherein the second data bus has a variable latency for data flow, the apparatus comprising:

a network interface, coupled to the first data bus, for receiving a first data packet from the first data bus and for transmitting a second data packet to the first data bus, said network interface asserting a receive activity signal while it receives said first data packet;

a receive buffer memory, having a first predetermined physical size and a first predetermined logical size, coupled to said network interface, for storing a portion of said first data packet, said receive buffer memory asserting a receive data transfer request signal when one or more bytes are stored therein;

a transmit buffer memory, having a second predetermined physical size, the second predetermined physical size differing from the first predetermined physical size and a second predetermined logical size, the second predetermined logical size differing from the first predetermined logical size, for storing a portion of said second data packet, and coupled to the network interface, said transmit buffer memory asserting a transmit data transfer request signal when a capacity for a number of bytes stored in said transmit buffer memory exceeds a predetermined number, and said transmit buffer memory asserting a frames signal when one or more frames are stored in said transmit buffer memory; and a memory buffer controller, coupled to said receive buffer memory, said transmit buffer memory, and the second data bus, for prioritizing a pending receive buffer data transfer over a pending transmit buffer memory data transfer when said receive activity signal is asserted to said memory buffer controller from said network interface.

3. A method for dynamically allocating a variable-latency bus access priority between a first and a second data transfer, wherein the first data transfer includes a data transfer from a receive FIFO buffer memory to a storage device coupled to a variable-latency bus and the second data transfer includes a data transfer from the storage device to a transmit FIFO buffer memory, wherein the receive FIFO buffer memory stores a portion of a first packet received over a fixed-speed bus and the transmit FIFO buffer memory stores a portion of a second packet for transmission over the fixed-speed bus, comprising the steps of:

prioritizing a pending first data transfer over a pending second data transfer when the receive FIFO buffer memory requests servicing, the receive FIFO buffer memory, having a first predetermined physical size and a first predetermined logical size, is receiving additional bytes from the fixed-speed bus, and the transmit FIFO buffer memory, the transmit FIFO buffer memory having a second predetermined physical size, the second predetermined physical size differing from the first predetermined physical size and a second predetermined logical size, the second predetermined logical size differing from the first predetermined logical size, stores one or more frames as indicated by a one or more frames signal; and prioritizing said pending second data transfer over pending first data transfer when the transmit FIFO buffer memory does not contain at least one frame, or the receive FIFO buffer memory is not receiving additional bytes from the fixed-speed bus.

* * * * *